March 12, 1946.   D. R. MOORE   2,396,336
ROTARY DRILLING MUD SEPARATOR
Filed Oct. 7, 1943   2 Sheets-Sheet 1
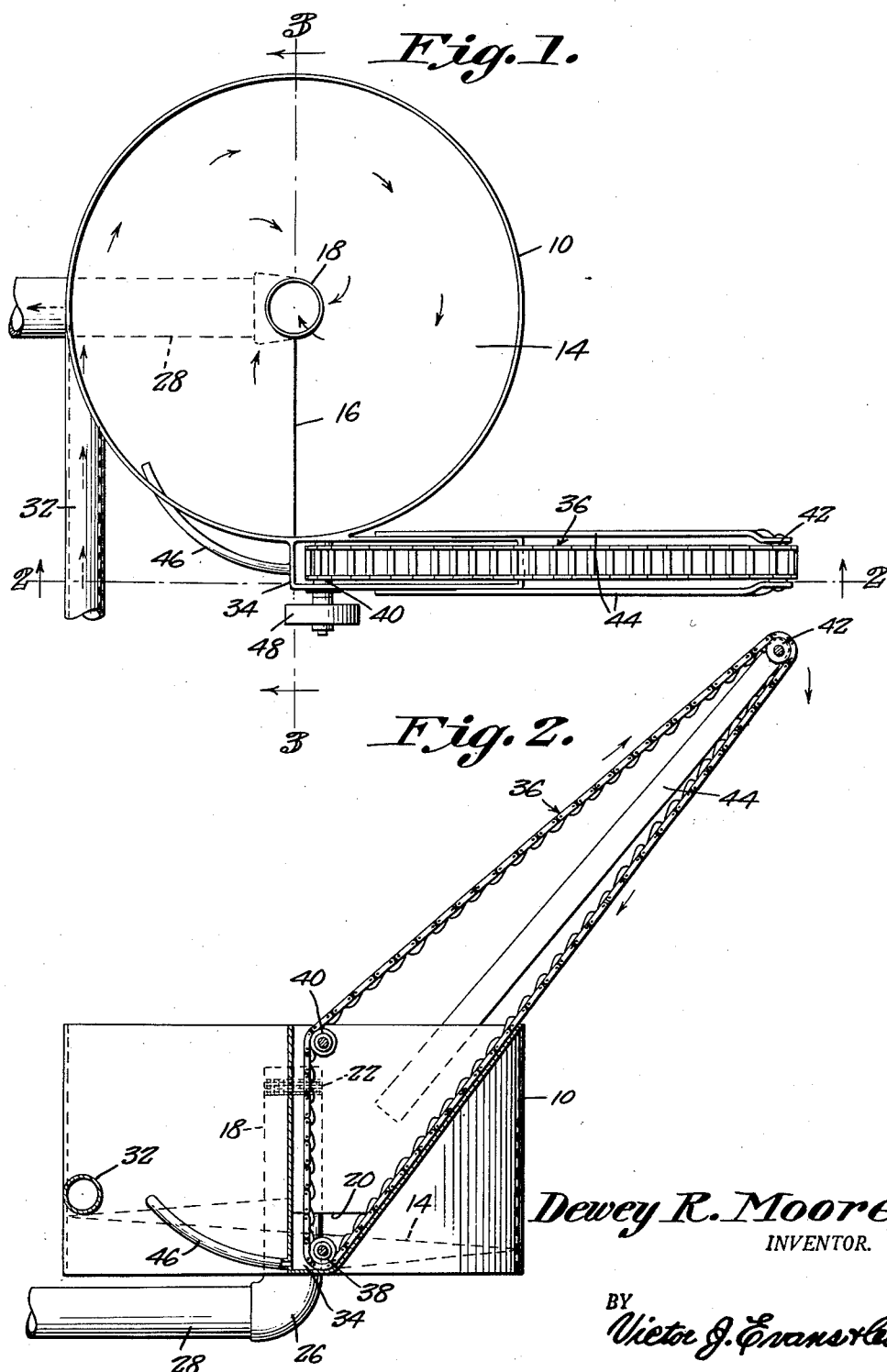
Dewey R. Moore,
INVENTOR.
BY
Victor J. Evans & Co.
ATTORNEYS March 12, 1946.   D. R. MOORE   2,396,336
ROTARY DRILLING MUD SEPARATOR
Filed Oct. 7, 1943   2 Sheets-Sheet 2
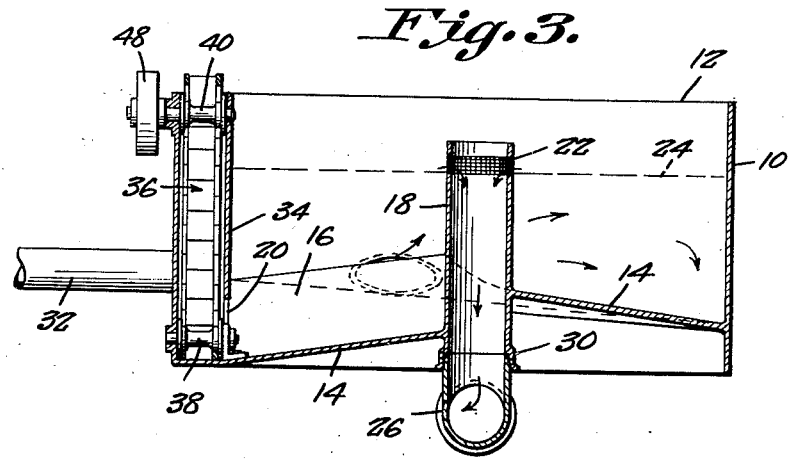
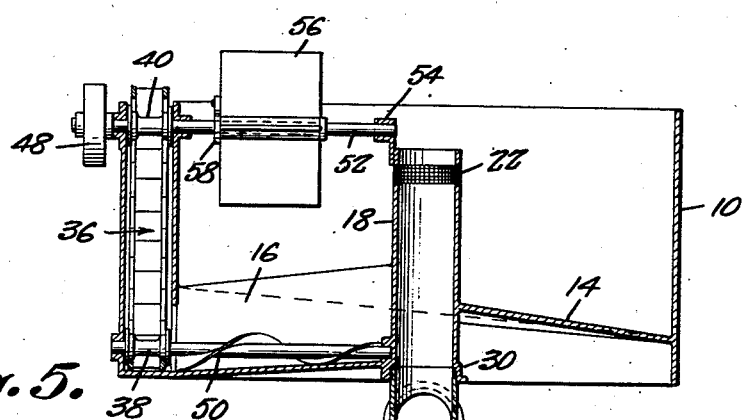
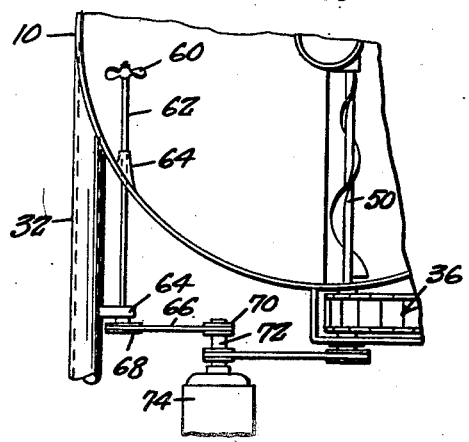
Dewey R. Moore,
INVENTOR.
BY
*Victor J. Evans & Co.*
ATTORNEYS Patented Mar. 12, 1946

2,396,336

UNITED STATES PATENT OFFICE 2,396,336

ROTARY DRILLING MUD SEPARATOR

Dewey R. Moore, Holdenville, Okla.

Application October 7, 1943, Serial No. 505,343

3 Claims. (Cl. 210—43)

My invention relates to rotary oil field drilling operations, and has among its objects and advantages the provision of an improved separator for separating drilling mud from sand and heavier mud.

In the accompanying drawings:

Figure 1 is a top view of the separator;

Figure 2 is a view taken substantially along the line 2—2 of Figure 1;

Figure 3 is a view taken substantially along the line 3—3 of Figure 1;

Figure 4 is a view similar to Figure 3 but illustrating a modification; and

Figure 5 is a view illustrating a further modification.

In the embodiment selected for illustration, I make use of a circular tank 10 having an open upper end 12 and a spirally shaped bottom 14. This bottom includes a vertical wall 16 arranged radially inside the tank and extending from one side thereof up to a drilling mud outlet pipe 18 arranged vertically inside the tank at its axis. The bottom 14 spirals downwardly uniformly from the vertical wall 16 throughout the entire circumference of the tank. A mud and sand outlet 20 is provided in the side wall of the tank 10 adjacent the vertical wall 16 and at the lowermost end of the bottom 14.

The tube 18 is provided with a screen 22 extending circumferentially about the tube and inwardly a short distance from its upper end. Under normal operating conditions, the drilling mud approx'mates the level 24 and flows through the screen 22 and downwardly inside the tube 18. An elbow 26 connects the tube 18 with an outlet pipe 28. Figure 3 illustrates the elbow 26 as having threaded connection with an internally threaded flange 30 at the lower end of the tube 18. This flange lies inside the tank 10 to provide a flush contour when the elbow is disconnected to facilitate loading of the tank on trucks and the like.

The material to be separated is delivered to the tank 10 through the medium of an inlet pipe 32 arranged tangentially of the tank. A small pressure head is employed. Because of the arrangement of the inlet tube 32, a rotary motion is imparted to the liquid mass in the tank 10. This motion causes the denser sand, mud and the like to move to the outside and crowd the lighter drilling mud inward and flow into the tube 18.

Much of the heavy substance will settle immediately upon entrance to the bottom of the tank. The spiral contour of the bottom 14 eliminates piling up of such material, since the bottom drops progressively from the point of entrance of the material to the sludge outlet 20.

To remove the heavier material separated from the drilling mud, the opening 20 places the tank 10 in communication with a chamber 34 in which is located an endless conveyor 36 of the chain type. The chamber 34 is of triangular contour when viewed according to Figure 2, and the conveyor passes around a sprocket 38 located at the bottom of the chamber 34 to bring the conveyor into material pickup relationship with the bottom zone of the chamber. This conveyor passes around a drive sprocket 40 located vertically of the sprocket 38 and around a sprocket 42 at the upper end of a supporting frame 44. The mud and sand is discharged from the upper end of the conveyor.

The upper end of the tube 18 terminates short of the upper end of the tank 10, and the tube 18 is open at its upper end. This provides an overflow in the event that the screen 22 should become clogged.

The operating pressure head is obtained by placing the separator at a lower level than the point where the flow line connects with the surface pipe of the drilling equipment (not shown). A small diameter tube 46 places the bottom of the chamber 34 in communication with the tank 10 slightly above the floor 14. A pulley 48 is fixedly related to the sprocket 40 for connection with a source of power (not shown).

In the event that an excessive amount of sand and heavy mud should accumulate adjacent the vertical wall 16, Figure 4 illustrates an auger 50 fixedly connected with the sprocket 38 to aid in the delivery of the material to the conveyor. In some cases, the position of the rig might make it impossible to obtain a sufficient pressure head. In such cases, a shaft 52 is fixedly connected with the sprocket 40 and supported in a bearing 54 on the tube 18. This shaft is provided with a paddle wheel 56 mounted loosely on the shaft and caused to rotate therewith through the medium of a ratchet 58. The ratchet permits the paddle wheel to rotate when motive power is cut off. Since the shaft 52 is arranged radially of the tank 10, rotation of the paddle wheel 56 imparts the necessary rotation to the liquid in the tank for separating purposes.

Figure 5 illustrates the tank 10 as being provided with a propeller 60 attached to a shaft 62 projecting inside the tank. This shaft is supported in bearings 64 and may be driven by a belt 66 passing around a grooved wheel 68 attached to the shaft 62 and around a grooved wheel 70 attached to a shaft 72 driven by a motor 74. This motor may be employed for driving the auger 50 and the conveyor 36. The shaft 62 is arranged in parallelism with the inlet pipe 32 and is tangentially positioned inside the tank so as to impart rotary motion to the liquid body.

Without further elaboration, the foregoing will so fully illustrate my invention, that others may, by applying current knowledge, readily adapt the same for use under various conditions of service.

I claim:

1. A rotary drilling mud separator comprising an open top, cylindrical tank having a drilling mud outlet pipe, extending upwardly from the bottom of the tank and centrally thereof, said tank having a second outlet for heavier material to be separated from the drilling mud, said second outlet being located radially from said first mentioned outlet and adjacent the bottom and side wall of the tank, a drilling mud inlet communicating with the tank on a plane between the top of the first outlet and the second outlet and extending in tangential relationship with the tank to rotate the contents of the tank and cause separation of the rotary drilling mud from the heavier material, said tank having a spirally contoured bottom descending from said inlet to said second outlet, said bottom having an upright wall between its uppermost and lowermost ends, auger means adjacent the lower end of said upright wall for moving the heavier material through said second outlet and means operated by a source of power outside of said tank for removing the heavier material from said tank, said auger means being operated by said means for removing the heavier material from said tank.

2. A rotary drilling mud separator comprising an open top, cylindrical tank having a drilling mud outlet pipe, extending upwardly from the bottom of the tank and centrally thereof, said tank having a second outlet for heavier material to be separated from the drilling mud, said second outlet being located radially from said first mentioned outlet and adjacent the bottom and side wall of the tank, a drilling mud inlet communicating with the tank on a plane between the top of the first outlet and the second outlet and extending in tangential relationship with the tank to rotate the contents of the tank and cause separation of the rotary drilling mud from the heavier material, said tank having a spirally contoured bottom descending from said inlet to said second outlet, said bottom having an upright wall between its uppermost and lowermost ends, auger means adjacent the lower end of said upright wall for moving the heavier material through said second outlet and means for removing the heavier material from said tank comprising a conveyor located at the delivery end of said auger.

3. A rotary drilling mud separator comprising a circular open topped tank positioned upright and provided with a spirally descending bottom extending circumferentially about the tank, an upright tube centrally of the tank for removal of the rotary drilling mud, said upright tube having an open upper end and a screen interposed in the tube inwardly of the upper end, a drilling mud outlet pipe, an elbow connecting the drilling mud outlet pipe with said upright tube, said elbow being detachably connected with the upright tube below the lower end of the tank, said bottom having an upright wall connecting its upper and lower ends, said tank being provided with a second outlet in its wall adjacent said upright wall and beneath the upper end of the bottom, a drilling mud inlet pipe communicating with the tank tangentially thereof for imparting rotary motion to the contents of the tank and causing separation of the rotary drilling mud from heavier material, with the rotary drilling mud overflowing through said upright tube and the heavier material moving outwardly and downwardly of the tank, a receiving chamber having communication with said tank by means of a second outlet, and a conveyor extending into said receiving chamber for removing the heavier material.

DEWEY R. MOORE.